UNITED STATES PATENT OFFICE.

JOHN McDERBY AND AUGUSTUS G. STEVENS, OF MANCHESTER, N. H.

IMPROVEMENT IN ROOFING COMPOSITIONS.

Specification forming part of Letters Patent No. 152,503, dated June 30, 1874; application filed March 14, 1874.

*To all whom it may concern:*

Be it known that we, JOHN McDERBY and AUGUSTUS G. STEVENS, of Manchester, in the county of Hillsborough and State of New Hampshire, have invented certain Improvements in Roofing Composition, known in the market as the "McDerby and Stevens Roofing," of which the following is a specification:

We prepare it as follows: We take five hundred pounds wood-ashes and two thousand pounds coal-ashes, and pass them through a No. 12 wire screen. With this we then thoroughly mix fifty pounds pipe-clay, pulverized, and thirty pounds of oakum, cut fine, so that the fibers are about one inch in length. To this mixture, while being constantly stirred by machinery, is added four barrels of coal-tar, which renders the mass of about the same consistence of glaziers' putty. This composition is then packed in barrels, and sold to the trade, to be spread upon roofs of buildings, previously covered with layers of tarred paper or felt, by means of a hand-trowel. The addition of the oakum tends by its fibrous nature to bind the cement together, much as hair is used by plasterers to bind plastering to the wall. The addition of pipe-clay also increases its adhesive properties, so that the direct rays of a summer's sun do not cause it to run or drip from roofs to which it is applied.

After our composition is spread upon roofs we recommend usually sprinkling over its surface dry sifted gravel or sand. Experience has demonstrated that it will not crack in the cold weather of winter or run or drip in the hottest temperature of summer.

We claim as our invention—

The within-mentioned composition for roofing, consisting of coal and wood ashes, pipe-clay, oakum, and coal-tar, when combined together in about these proportions, and for the purpose set forth.

JOHN McDERBY.
AUGUSTUS G. STEVENS.

Witnesses:
C. W. WILKINS,
R. J. P. GOODWIN.